United States Patent Office

2,806,011
VINYL CHLORIDE POLYMERS PLASTICIZED WITH TETRA-ALKYL ALKENETETRA CARBOXYLATES

Joachim Dazzi, Dayton, Ohio, assignor to Monsanto Chemical Company, St. Louis, Mo., a corporation of Delaware No Drawing. Original application March 12, 1953, Serial No. 342,031, now Patent No. 2,769,834, dated November 6, 1956. Divided and this application May 9, 1956, Serial No. 583,639

3 Claims. (Cl. 260—31.8)

The present invention relates to organic compounds and deals more particularly with addition products of dialkyl fumarates and dialkyl alkenylsuccinates, to methods of preparing the same, and to vinyl chloride polymers plasticized with the new addition products.

According to the invention there are provided new and valuable polycarboxylates in which one mole of a dialkyl fumarate of from 6 to 12 carbon atoms is combined with one mole of a dialkyl alkenylsuccinate in which the alkyl radical has from 1 to 6 carbon atoms and the alkenyl radical has from 5 to 18 carbon atoms. The new polycarboxylates are formed by a simple addition reaction in which one mole of the succinate adds to one mole of the fumarate. While the structure of the 1:1 adducts thus formed cannot be definitely determined, the adducts are believed to be tetra-alkyl alkenetetracarboxylates, the addition reaction proceeding probably according to the scheme:

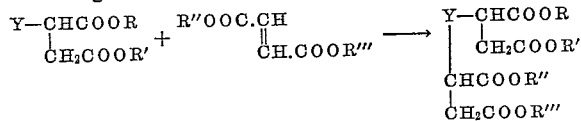

in which R, R', R" and R''' are alkyl radicals of from 1 to 6 carbon atoms and Y is an alkenyl radical of from 5 to 18 carbon atoms.

Dialkyl fumarates and dialkyl alkenylsuccinates useful for the preparation of the present adducts are esters in which all alkyl radicals may be derived from the same alcohol, i. e., the diethyl, dimethyl, di-isopropyl, di-n-propyl, diamyl, dihexyl, di-n-butyl and di-tert-butyl fumarate or dimethyl, diisobutyl, diamyl, dihexyl or diethyl amylenesuccinate, hexenylsuccinate, octenylsuccinate, dodecenylsuccinate, or octadecenylsuccinate, or mixed esters such as ethyl hexyl fumarate, ethyl propyl dodecenylsuccinate, butyl ethyl fumarate, amyl ethyl decenylsuccinate, etc. The alkenylsuccinates are readily obtainable by the method generally described in the Eichwald U. S. Patent No. 2,055,456, wherein maleic anhydride is reacted with an olefin such as amylene, diisobutylene or cracked benzine to give the corresponding alkenylsuccinic acids which upon esterification are converted to the presently useful dialkyl alkenylsuccinates.

The addition reaction is effected simply by heating the fumarate with the alkenylsuccinate at a temperature of at least 200° C. until formation of the 1:1 adduct has occurred. The heating temperature may be from 200° C. to 300° C., depending upon the nature of the individual reactants; it should not exceed a temperature at which either reactant or the product is decomposed. Refluxing temperatures of the reaction mixture are preferred. Termination of the reaction is generally evidenced by noting cessation in rise of the refluxing temperature. The course of the reaction may also be followed by noting the change in the refractive index of the reaction mixture.

Since the present products are formed by the addition of one mole of the alkenylsuccinate to one mole of the fumarate, molar equivalents of the reactants may be advantageously employed in the reaction mixture. However, since any unreacted materials may be readily recovered from the reaction product, an excess of either reactant may be used.

The present adducts are stable, high-boiling alkenepolycarboxylates which range from clear, viscous liquids to waxy solids. They are advantageously used for a variety of industrial purposes, and are characterized by conferring improved plasticity to synthetic resins and plastics when incorporated therein. They impart increased flexibility to vinyl chloride polymers, which flexibility is retained at even low temperatures. At high temperatures, the present adducts are not readily volatilized from the plasticized composition, even when present in concentrations of up to 50 percent by weight.

The invention is further illustrated, but not limited, by the following examples:

Example 1

A mixture of 68 g. (0.2 mole) of dibutyl diisobutenylsuccinate (obtained from diisobutene maleic anhydride addition reaction and esterification with n-butanol) and 114 g. (0.5 mole) of dibutyl fumarate was refluxed for about 3 hours at a temperature of from 259° C. to 271° C. Distillation of the resulting product to remove material boiling below 206° C./1–2 mm. gave as residue 75.5 g. of an adduct $n_D^{25}$ 1.4652, in which one mole of dibutyl diisobutenylsuccinate is combined with one mole of dibutyl fumarate.

Example 2

Sixty parts of polyvinyl chloride and 40 parts by weight of the adduct of Example 1 were mixed on a milling roll to a homogeneous blend. During the milling there was observed substantially no fumes and discoloration. A molded sheet of the mixture was clear, transparent and substantially colorless. Testing of the molded sheet by the Clash-Berg method gave a low temperature flexibility value of minus 14.2° C. Tests on the volatility characteristics of the plasticized composition employing the carbon absorption method of the Society of Plastics Industry gave a volatility value of 1.03 percent. When subjected to a heat of 225° F. for a period of 30 minutes the clarity and color of the molded product were substantially unchanged. After immersion in water at room temperature for 24 hours there was found to be a solids loss of 0.054 percent and a water absorption of 0.66 percent.

Similar testing of dibutyl or bis(2-ethylhexyl)diisobutenyl succinate showed these esters to be incompatible with polyvinyl chloride.

While the above example shows only a composition in which the ratio of plasticizer to polymer content is 40:60, the content of adduct to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of the adduct based on the total weight of the plasticized composition yielding desirable products.

Although the invention has been described particularly with reference to the use of the present adducts as plasticizers for polyvinyl chloride, they are advantageously employed also as plasticizers for copolymers of vinyl chloride, for example, the copolymers of vinyl chloride with vinyl acetate, vinylidene chloride, etc. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized products does not impair the valuable properties of the adducts. The present adducts are of general utility in softening vinyl chloride polymers. They may be used as the only plasticizing component in a compounded vinyl chloride or they may be used in conjunction with other plasticizers.

This application is a division of my copending application Serial No. 342,031, filed March 12, 1953, now Patent No. 2,769,834.

What I claim is:

1. A resinous composition comprising a vinyl chloride polymer plasticized with an adduct in which there is combined 1 mole of a dialkyl alkenylsuccinate in which the alkyl radical has from 1 to 6 carbon atoms and the alkenyl radical has from 5 to 18 carbon atoms with 1 mole of a dialkyl fumarate of from 6 to 16 carbon atoms.

2. A resinous composition comprising polyvinyl chloride plasticized with an adduct in which there is combined 1 mole of a dialkyl alkenylsuccinate in which the alkyl radical has from 1 to 6 carbon atoms and the alkenyl radical has from 5 to 18 carbon atoms with 1 mole of a dialkyl fumarate of from 6 to 16 carbon atoms.

3. A resinous composition comprising a polyvinyl chloride plasticized with an adduct of 1 mole of dibutyl diisobutenylsuccinate with 1 mole of butyl fumarate.

No references cited.